United States Patent
Enomoto

(10) Patent No.: US 10,503,938 B2
(45) Date of Patent: Dec. 10, 2019

(54) WIRELESS TAG PASSING DETERMINATION APPARATUS

(71) Applicant: DENSO WAVE INCORPORATED, Chita-gun, Aichi-pref. (JP)

(72) Inventor: Kohei Enomoto, Aichi-Pref. (JP)

(73) Assignee: DENSO WAVE INCORPORATED, Chita-Gun, Aichi-Pref. (JP)

(*) Notice: Subject to any disclaimer, the term of this patent is extended or adjusted under 35 U.S.C. 154(b) by 0 days.

(21) Appl. No.: 15/921,733

(22) Filed: Mar. 15, 2018

(65) Prior Publication Data
US 2018/0276425 A1    Sep. 27, 2018

(30) Foreign Application Priority Data
Mar. 22, 2017 (JP) ................. 2017-056315

(51) Int. Cl.
*G06K 7/10* (2006.01)
*G06K 7/015* (2006.01)

(52) U.S. Cl.
CPC ......... *G06K 7/10108* (2013.01); *G06K 7/015* (2013.01); *G06K 7/10009* (2013.01); *G06K 7/10128* (2013.01); *G06K 7/10425* (2013.01); *G06K 7/10158* (2013.01)

(58) Field of Classification Search
CPC ............. G06K 7/0008; G06K 19/0723; G06K 7/10009; G06K 7/10297; G06K 7/10356; G06K 7/10316; G06K 7/10039; G06K 7/10128; G06K 7/10198

USPC ........................................................ 340/10.3
See application file for complete search history.

(56) References Cited

U.S. PATENT DOCUMENTS 7,839,289 B2 * 11/2010 Chung ................. G01S 5/0018
340/10.4
7,990,286 B2 *  8/2011 Shankwitz ............ G01C 21/26
340/435
8,207,820 B2 *  6/2012 Bauchot ................ G08C 21/00
235/385

(Continued)

FOREIGN PATENT DOCUMENTS

EP     2254076 A1   11/2010
EP     2733644 A1    5/2014

(Continued)

*Primary Examiner* — Mark S Blouin
(74) *Attorney, Agent, or Firm* — Harness, Dickey & Pierce, P.L.C.

(57) ABSTRACT

A wireless tag passing determination apparatus includes: an antenna that provides multiple communicable regions and a communication disabled region, the communicable regions being arranged alternately with the communication disabled region, such that the communicable regions includes both sides of a passing determination point in a longitudinal direction of a passage in which passing of a wireless tag is determined; a tag reader that determines whether to read a signal transmitted by the wireless tag, based on a signal representing electric wave transmitted by the wireless tag existing in the communicable regions and received by the antenna; and a passing determination section that determines whether the wireless tag passes by the passing determination point, based on a pattern of presence or absence of reading in association with a lapse of time.

10 Claims, 12 Drawing Sheets

(56) References Cited

U.S. PATENT DOCUMENTS

| | | | | |
|---|---|---|---|---|
| 8,242,907 B2* | 8/2012 | Butler | ............... | G06K 7/0008 |
| | | | | 340/572.1 |
| 8,248,211 B2* | 8/2012 | Bares | ............... | G06F 1/12 |
| | | | | 340/10.3 |
| 8,326,451 B2* | 12/2012 | Schantz | ............... | G01S 13/751 |
| | | | | 700/215 |
| 8,766,773 B2* | 7/2014 | Kennedy | ............... | H04W 99/00 |
| | | | | 340/10.1 |
| 8,783,626 B2* | 7/2014 | Cross | ............... | B61L 15/0027 |
| | | | | 246/122 R |
| 9,047,522 B1* | 6/2015 | Nikitin | ............... | G06K 7/0008 |
| 9,103,909 B2* | 8/2015 | Iagounov | ............... | G01S 13/04 |
| 9,129,165 B2* | 9/2015 | Sugano | ............... | G06K 7/10108 |
| 9,460,327 B2* | 10/2016 | Kamiya | ............... | G01S 13/58 |
| 9,842,289 B2* | 12/2017 | Eom | ............... | G06K 19/0723 |
| 2007/0069022 A1 | 3/2007 | Hatakeyama et al. | | |
| 2011/0001621 A1 | 1/2011 | Iwahashi | | |
| 2011/0239071 A1 | 9/2011 | Sugano et al. | | |
| 2014/0167920 A1 | 6/2014 | Kamiya | | |

FOREIGN PATENT DOCUMENTS

| | | | |
|---|---|---|---|
| GB | 2429559 | A | 2/2007 |
| JP | 4270187 | B2 | 5/2009 |

\* cited by examiner

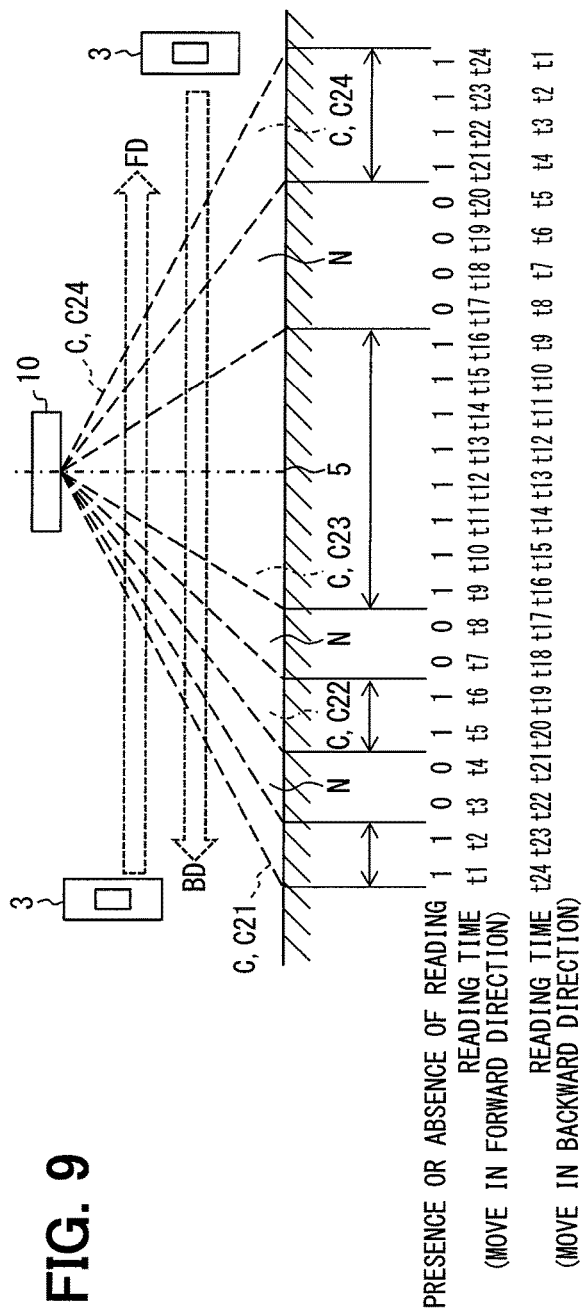
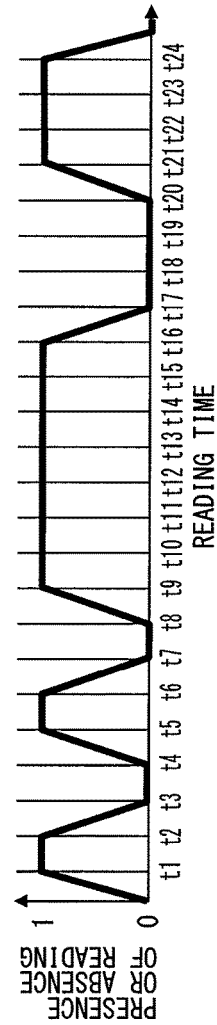
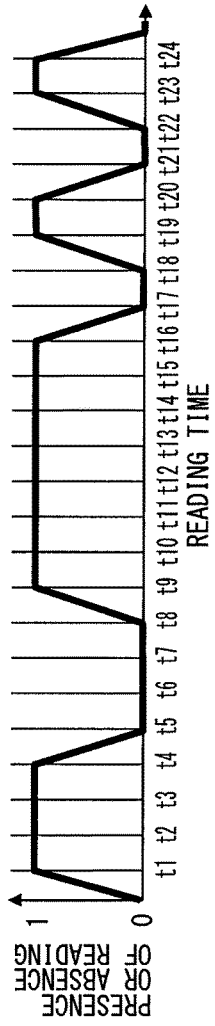
FIG. 9
FIG. 10
FIG. 11

TIME SERIES CODE OF PRESENCE
OR ABSENCE OF READING
OF WIRELESS TAG 3a

111111111111111111111111

TIME SERIES CODE OF PRESENCE
OR ABSENCE OF READING
OF WIRELESS TAG 3b

111111111111111111111111

WIRELESS TAG PASSING DETERMINATION APPARATUS

CROSS REFERENCE TO RELATED APPLICATION

This application is based on Japanese Patent Application No. 2017-056315 filed on Mar. 22, 2017, the disclosure of which is incorporated herein by reference.

Technical Field

The present disclosure relates to a wireless tag passing determination apparatus that determines passing of a wireless tag.

Background Art

Patent Literature 1: JP 4270187 B2 (corresponding to US 2007/0069022 A1)

A wireless communication system including multiple tag readers and antennas corresponding to respective tag readers is disclosed. In Patent Literature 1, three tag readers each have an antenna. The antennas of the tag readers form communication areas not overlapping with each other, and the communication areas are aligned along a conveyance passage.

The inventor of the present application has found the following.

By providing one communication area with a set of a tag reader and an antenna, and by providing the communication areas not overlapping with each other, it may be possible to determine all the time that the wireless tag exists in which communication area.

In Patent Literature 1, since three communication areas are aligned along the conveyance passage, it may be possible to determine that the wireless tag passes through the three communication areas sequentially, namely that the wireless tag passes through the conveyance passage. However, in a technique disclosed in Patent Literature 1, the number of the tag readers may have to correspond to that of the communication areas. Accordingly, the tag reader may not be arranged in some places depending on certain environments. In addition, a cost of the system may become higher.

SUMMARY

It is an object of the present disclosure to provide a wireless tag passing determination apparatus capable of reducing the number of tag readers.

According to one aspect of the present disclosure, a wireless tag passing determination apparatus includes: an antenna that provides multiple communicable regions and a communication disabled region, the communicable regions being arranged alternately with the communication disabled region, such that the communicable regions includes both sides of a passing determination point in a longitudinal direction of a passage in which passing of a wireless tag is determined; a tag reader that determines whether to read a signal transmitted by the wireless tag, based on a signal representing electric wave transmitted by the wireless tag existing in the communicable regions and received by the antenna; and a passing determination section that determines whether the wireless tag passes by the passing determination point, based on a pattern of presence or absence of reading in association with a lapse of time, the pattern of the presence or the absence of the reading being a pattern generated when the tag reader reads the signal transmitted by the wireless tag.

According to the configuration of the present disclosure, the antenna provides the multiple communicable regions and the communication disabled region alternately such that each of the multiple communicable regions includes the both sides of the passing determination point in the longitudinal direction of the passage in which the passing of the wireless tag is determined. With this configuration, in a case in which the wireless tag passes by the passing determination point, a time in which the tag reader can read the signal transmitted by the wireless tag and a time in which the tag reader cannot read the signal transmitted by the wireless tag are generated. Thus, in a case in which the wireless tag passes by the passing determination point, the pattern of the presence or absence of the reading in association with a lapse of time is a specific pattern generated, when the wireless tag passes by the passing determination point. Accordingly, it may be possible that the passing determination section determines whether the wireless tag passes by the passing determination point based on the pattern of the presence or absence of the reading in association with a lapse of time.

The tag reader may only determine whether the signal transmitted by the wireless tag is read, and it may not be necessary to determine that the wireless tag exists in which region among the multiple communicable regions. Consequently, it is not necessary to arrange a tag reader for each of the communicable regions. Accordingly, it may be possible to reduce the number of the tag readers.

BRIEF DESCRIPTION OF DRAWINGS

The above and other objects, features, and advantages of the present disclosure will become more apparent from the following detailed description with reference to the accompanying drawings. In the drawings:

FIG. 9 is a diagram illustrating a communicable region according to at least one of embodiments;

FIG. 10 is a diagram illustrating a line graph illustrating a relationship between a reading time and a time series code in passing when a wireless tag is moved in a forward direction;

FIG. 11 is a diagram illustrating a line graph illustrating a relationship between the reading time and the time series code in passing when the wireless tag is moved in a backward direction;

DETAILED DESCRIPTION

Hereinafter, embodiments of the present disclosure are described with reference to the drawings.

First Embodiment

Figure 1:
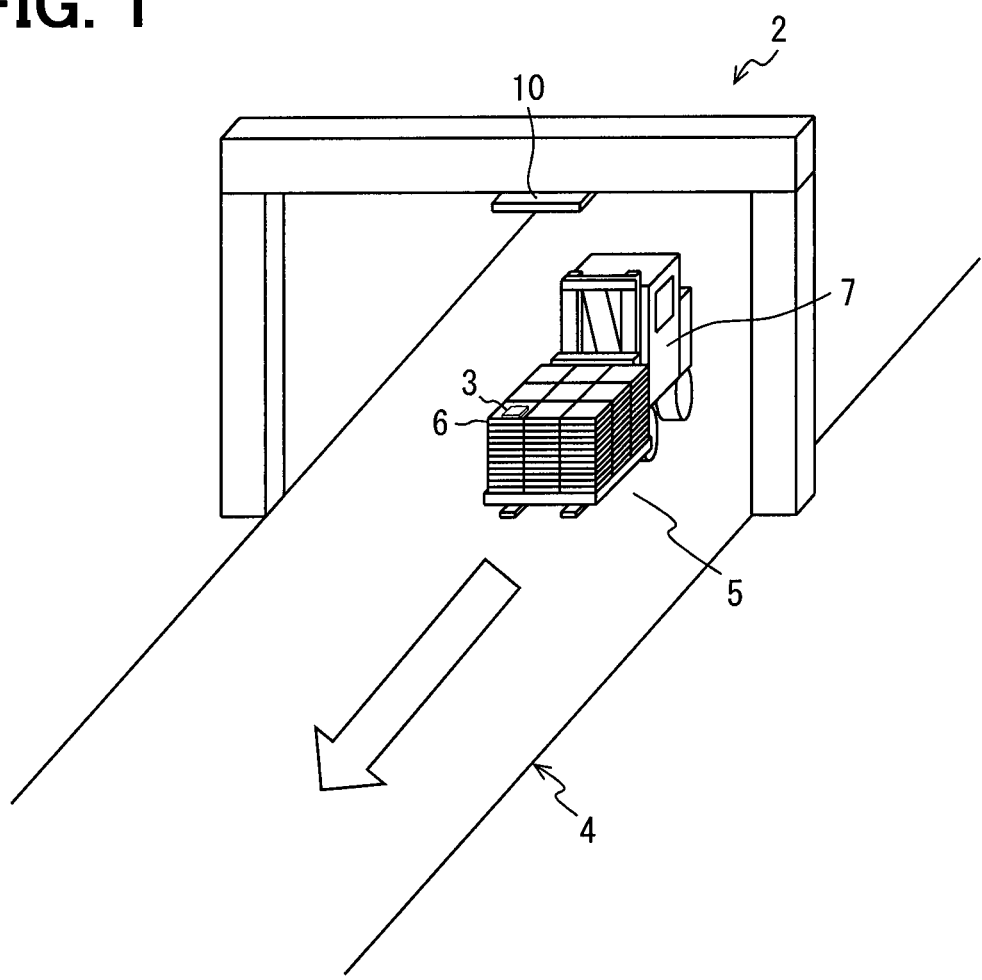
FIG. 1 is a diagram illustrating a usage state of a tag reader.

FIG. 1 shows a usage state of a tag reader 10 having a function as a wireless tag passing determination apparatus according to the present disclosure. In the usage example shown in FIG. 1, the tag reader 10 is disposed on an upper side of a gate 2, and determines whether a wireless tag 3 traveling a passage 4 passes by a passing determination point 5 located below the gate 2. A wireless tag may be referred to as a radio tag.

In the example shown in FIG. 1, the wireless tag 3 is stuck on a cargo box 6. The cargo box 6 is carried by a forklift truck 7. For the convenience of illustration, the wireless tag 3 is stuck on only one cargo box 6. However practically, the wireless tag 3 is stuck to every cargo box 6 to be managed.

The wireless tag 3 may be stuck on any article in addition to the cargo box 6. A unit (means or method) to convey an article on which the wireless tag 3 is stuck may be any conveyance unit such as a belt conveyer line, in addition to the forklift truck 7.

The tag reader 10 transmits a transmission wave that is electric wave for reading the wireless tag to a place of the passage 4 near below the gate. A frequency of the transmission wave may be set to a legally allowed frequency. In the present embodiment, a frequency in the UHF band (that is, 300 MHz to 3000 MHz) is adopted as an example.

The wireless tag 3 is a passive tag, and is driven by electric power generated when receiving the transmission wave to transmit a signal in response to the transmission wave to the tag reader 10 by electric wave. The signal transmitted by the wireless tag 3 includes an ID that identifies the wireless tag 3.

The tag reader 10 receives the electric wave transmitted by the wireless tag 3. Hereinafter, the electric wave transmitted by the wireless tag 3 and received by the tag reader 10 is referred to as a reception wave. The tag reader 10 determines whether the wireless tag 3 passes by the passing determination point 5, based on the reception wave.

Figure 2:
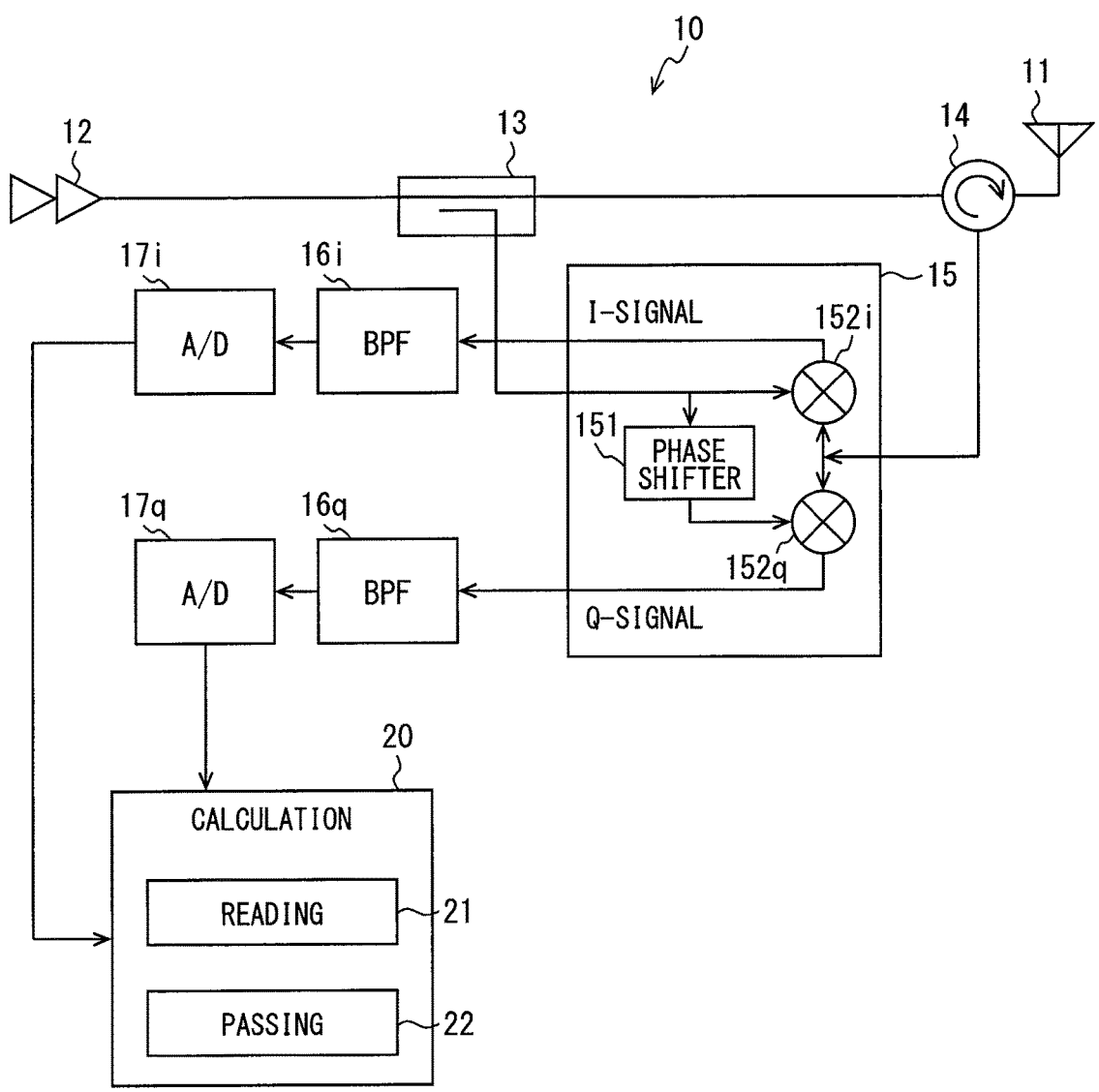
FIG. 2 is a block diagram illustrating a configuration of the tag reader.

FIG. 2 shows a configuration of the tag reader 10. The tag reader 10 includes an antenna 11, a transmitter 12, a coupler 13, an antenna duplexer 14, a quadrature demodulator 15, bandpass filters 16$i$, 16$q$, AD converters 17$i$, 17$q$, and a calculation portion 20.

Figure 3:
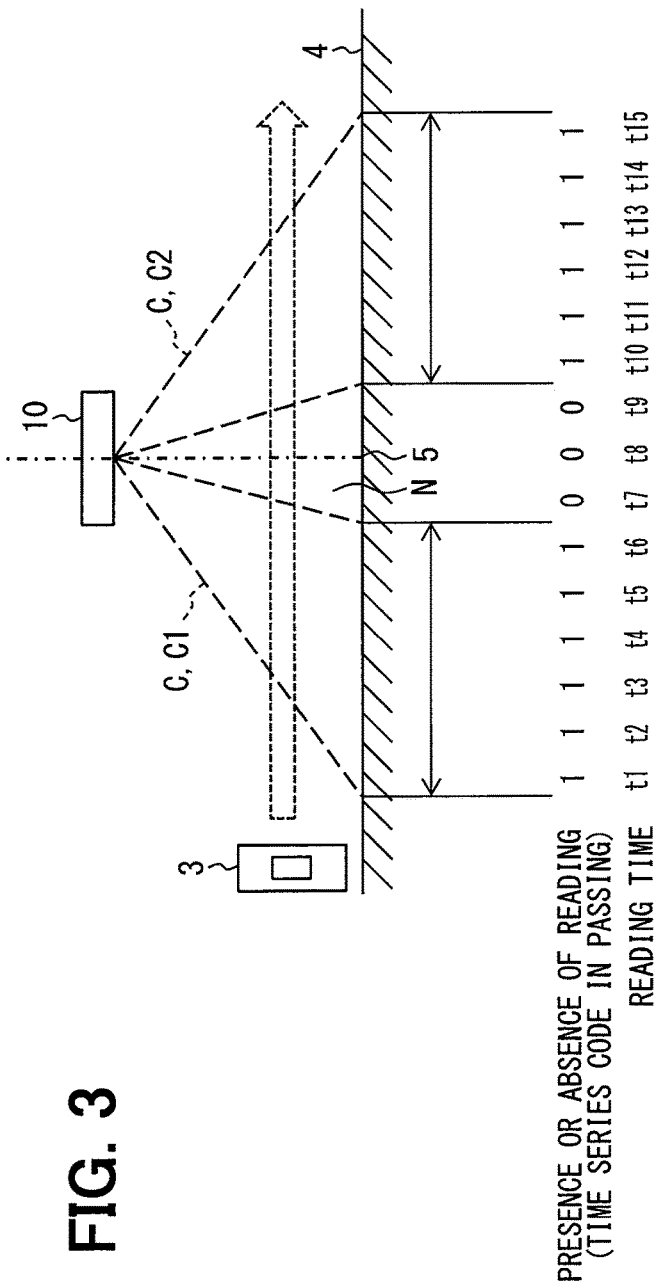
FIG. 3 is a diagram illustrating a relationship between a communicable region C, a communication disabled region N, presence or absence of reading, and a reading time.

The antenna 11 transmits the transmission wave that is electric wave for reading the wireless tag, and receives the electric wave transmitted by the wireless tag 3 in response to the transmission wave. The antenna 11 in the present embodiment is an array antenna that provides multiple communicable regions C including both sides of the passing determination point 5 in a longitudinal direction of the passage 4. Specifically, in the first embodiment, as shown in FIG. 3, two communicable regions C1, C2 are formed to be symmetrical with respect to the longitudinal direction of the passage 4 across the passing determination point 5. Each communicable region C is a region where the antenna 11 reads the signal transmitted by the wireless tag 3 by communicating with the wireless tag 3.

A communication disabled region N is located between adjacent two of the communicable regions C to distinguish the adjacent communicable regions C from each other. Thus, the communicable regions C and the communication disabled regions N are alternately arranged. Since the number of communicable regions C is at least two, the minimum number of communication disabled regions N each located between the adjacent communicable regions C is one.

The transmitter 12 generates and outputs a transmission signal representing the transmission wave transmitted toward the communicable region C. This signal is branched by the coupler 13 to direct toward the antenna duplexer 14 and the quadrature demodulator 15. The antenna duplexer 14 outputs the signal from the transmitter 12 to the antenna 11, and outputs the reception signal representing the reception wave received by the antenna 11 to the quadrature demodulator 15. The antenna 11 emits the transmission wave into the air and receives the electric wave from the wireless tag 3.

The reception wave received by the antenna 11 is input into the quadrature demodulator 15. The quadrature demodulator 15 includes a phase shifter 151, and two mixers 152$i$, 152$q$. The signal representing the transmission wave branched by the coupler 13 is input into the phase shifter 151. The reception signal and the transmission signal are input into the mixer 152$i$. The mixer 152$i$ mixes the reception signal with the transmission signal to generate an I-signal that is the same phase component of a baseband signal. The reception signal and a signal in which a phase of the transmission signal is shifted by 90 degrees by the phase shifter 151 are input into the mixer 152$q$. The mixer 152$q$ generates a Q-signal that is a quadrature component of the baseband signal.

The signal obtained in the mixer 152$i$ is input into the calculation portion 20 through the bandpass filter 16$i$ and the AD converter 17$i$. The signal obtained in the mixer 152$q$ is input into the calculation portion 20 through the bandpass filter 16$q$ and the AD converter 17$q$. The bandpass filters 16$i$, 16$q$ allow a signal component without a time phase $\omega t$ to selectively pass therethrough.

The calculation portion 20 includes a computer including a CPU, a ROM, a RAM, or the like. The CPU executes a program stored in a storage medium such as the ROM while using a temporary storage function of the RAM, thereby working as a reading determination section 21 and a passing determination section 22. Executing these functions means that a method corresponding to the program is executed. Some of or all of the functional blocks of the calculation portion 20 may be implemented by using one or more ICs (i.e., hardware). Some of or all of the functions of the calculation portion 20 may be implemented by a combination of a hardware member with execution of software by the CPU. The ROM is an example of a non-transitory tangible computer readable storage medium.

The reading determination section 21 acquires the reception signal representing the electric wave transmitted by the wireless tag 3 existing in the communicable region C and received by the antenna 11, to determine whether the signal transmitted by the wireless tag 3 is read. This determination is made as to whether predetermined information such as an ID is read by decoding the reception signal. The reading determination section 21 transmits the transmission wave periodically to determine whether the predetermined information is read. Then, a determination result is temporarily stored together with the time and the ID in a determination result storage unit, such as the RAM, defined in advance.

The passing determination section 22 determines whether the wireless tag 3 passes by the passing determination point 5, based on a pattern of presence or absence of reading in association with a lapse of time. FIG. 3 exemplarily shows the presence or absence of the reading and the lapse of the reading time when the wireless tag 3 passes by the passing determination point 5 along the passage 4 at a constant speed. As to the presence or absence of the reading, "1" indicates the case where the reading has been performed, and "0" indicates the case where the reading has not been performed. In the example shown in FIG. 3, the tag reader 10 transmits the transmission wave at each time t.

From time t1 to time t6, the wireless tag 3 exists in the communicable region C1, and therefore the tag reader 10 can read the signal transmitted by the wireless tag 3. From time t10 to time t15, the wireless tag 3 exists in the communicable region C2, and therefore the tag reader 10 can read the signal transmitted by the wireless tag 3. On the other hand, from time t7 to time t9, the wireless tag 3 exists in the communication disabled region N, and therefore even if the tag reader 10 transmits the transmission wave, the wireless tag 3 does not transmit a signal. Thus, from time t7 to time t9, the tag reader 10 determines absence of the reading, that is, determines that the signal from the wireless tag 3 cannot be read.

The time series code in which the presence and absence of the reading are respectively represented by "1" and "0" shown in FIG. 3 is a time series code in passing. The time series code in passing is a numeric string of results of the presence or absence of the reading aligned in time series when the wireless tag 3 is moved from an end far from the passing determination point 5 in the communicable region C1 to an end far from the passing determination point 5 in the communicable region C2. The time series code in passing is a specific code when the wireless tag 3 passes by the passing determination point 5. It is assumed that a moving speed of the wireless tag 3 is constant.

Figure 4:
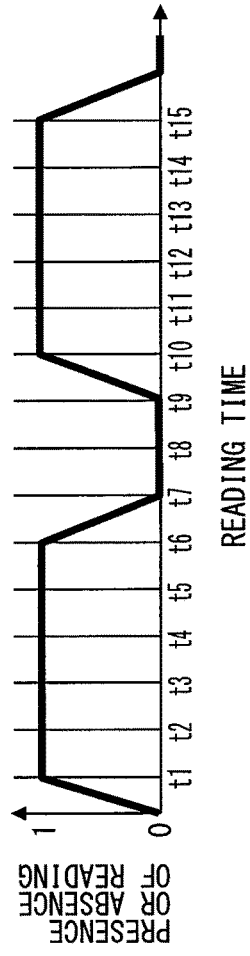
FIG. 4 is a diagram illustrating a line graph of a time series code in passing shown in FIG. 3.

The communicable region C can be set in advance by adjusting the directivity of the antenna 11, and therefore the time series code in passing can be stored in advance. FIG. 4 shows a line graph of the time series code in passing shown in FIG. 3. The time series code in passing is one example of a reference pattern showing results of the presence or the absence of the reading with the lapse of time.

The passing determination section 22 generates a time series code of the presence or absence of the reading from the results of determination as to the presence or absence of the reading successively made by the reading determination section 21. The time series code of the presence or absence of the reading is one example of a pattern of the presence or absence of the reading in association with a lapse of time.

The passing determination section 22 determines whether the wireless tag 3 passes by the passing determination point 5 by comparing the generated time series code of the presence or absence of the reading with the time series code in passing. As a result of the comparison, in a case in which the time series code or a code having the same ratio of the presence and absence of the reading as that in the time series code in passing is included in the time series code of the presence or absence of the reading, it is determined that the wireless tag 3 has passed by the passing determination point 5.

The code having the same ratio of the presence and absence of the reading as that in the time series code in passing is described in detail by using the time series code in passing shown in FIG. 3. The time series code in passing shown in FIG. 3 is six "1", three "0", and six "1" in this order. That is, a ratio of "1", "0", and "1" is 2:1:2.

Thus, in a case of the time series code in passing shown in FIG. 3, the code having the same ratio of the presence and absence of the reading as that in the time series code in passing is a code in which a ratio of "1", "0", and "1" is 2:1:2.

It is determined that the wireless tag 3 passes by the passing determination point 5 also in a case in which the code having the same ratio of the presence and absence of the reading as that in the time series code in passing is included in the time series code of the presence or absence of the reading, since a difference in moving speed of the wireless tag 3 is considered.

When the moving speed of the wireless tag 3 is different, the number of communications between the wireless tag 3 and the tag reader 10 is changed between the communicable regions C1, C2 and the communication disabled region N. However, when the wireless tag 3 is moved from the end far from the passing determination point 5 in the communicable region C1 to the end far from the passing determination point 5 in the communicable region C2 at a constant speed, the code having the same ratio of the presence and absence of the reading as that in the time series code in passing is supposed to be included. Thus, it is determined that the wireless tag 3 passes by the passing determination point 5 also in a case in which the code having the same ratio of the presence and absence of the reading as that in the time series code in passing is included in the time series code of the presence or absence of the reading.

Figure 5:
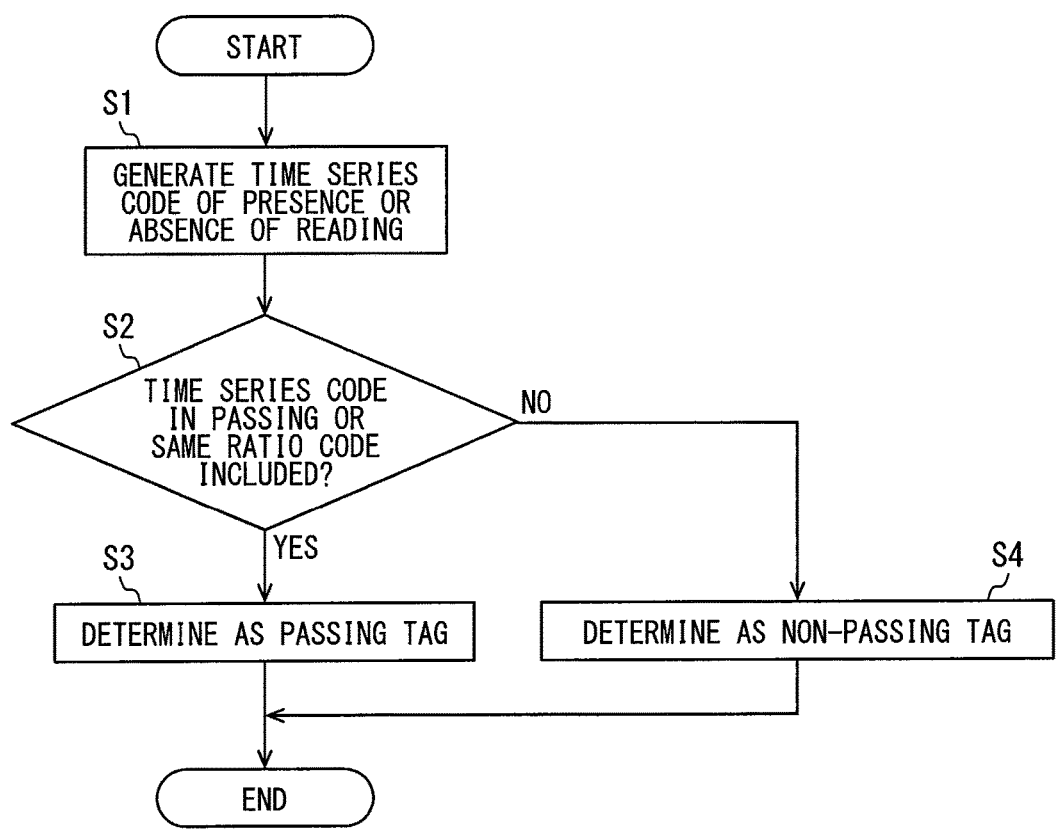
FIG. 5 is a flowchart illustrating processing of a passing determination section shown in FIG. 2.

FIG. 5 is a flowchart illustrating processing of the passing determination section 22. The processing shown in FIG. 5 is executed every time when the transmission wave is transmitted. In S1, determination results of the reading determination section 21 in a predetermined past time period are acquired from the determination result storage portion and the time series code of the presence or absence of the reading is generated for each wireless tag.

In the following S2, it is determined whether the time series code in passing or the code having the same ratio of the presence and absence of the reading as that in the time series code in passing is included in the time series code of the presence or absence of the reading generated in S1. In a case of YES in this determination, the procedure proceeds to S3, and it is determined that the wireless tag 3 has passed by the passing determination point 5. On the other hand, in a case of NO in the determination of S2, the procedure proceeds to S4, and it is determined that the wireless tag 3 is a non-passing tag that does not pass by the passing determination point 5.

In the first embodiment as described above, the antenna 11 provides two communicable regions C1, C2 and the communication disabled region N between the two communicable regions C1, C2. The communicable regions C1, C2 and the communication disabled region N are formed to include the both sides of the passing determination point 5 in the longitudinal direction of the passage 4.

Since the communicable regions C1, C2 and the communication disabled region N are formed in such a way, when the wireless tag 3 passes by the passing determination point 5, the time when the tag reader 10 can read the signal transmitted by the wireless tag 3 and the time when the tag reader 10 cannot read the signal transmitted by the wireless tag 3 are generated.

Thus, in a case in which the wireless tag 3 passes by the passing determination point 5, the time series code of the presence or absence of the reading is a specific code when the wireless tag 3 passes by the passing determination point 5. The specific code is stored in advance as the time series code in passing, and the passing determination section 22 determines whether the wireless tag 3 passes by the passing determination point 5 by comparing the time series code of the presence or absence of the reading with the time series code in passing.

In order to generate the time series code of the presence or absence of the reading, it may be only determined whether the signal transmitted by the wireless tag 3 is read, and therefore it may not be necessary to determine that the wireless tag 3 exists in which region of the two communicable regions C1, C2. Accordingly, it is not necessary to arrange a tag reader 10 for each of two communicable regions C1, C2. Thus, it may be possible to set the number of the tag readers 10 to be one, which is fewer than the number of the communicable regions C1, C2.

Second Embodiment

A second embodiment will be described. In the description of the second embodiment and the following embodiments, a component to which the same reference sign as that already used is assigned is the same as the component to which the same reference sign is assigned used in the former embodiment unless otherwise described. In a case in which a part of a configuration is described, a configuration described in the former embodiment can be applied to the other parts of the configuration.

Figure 6:
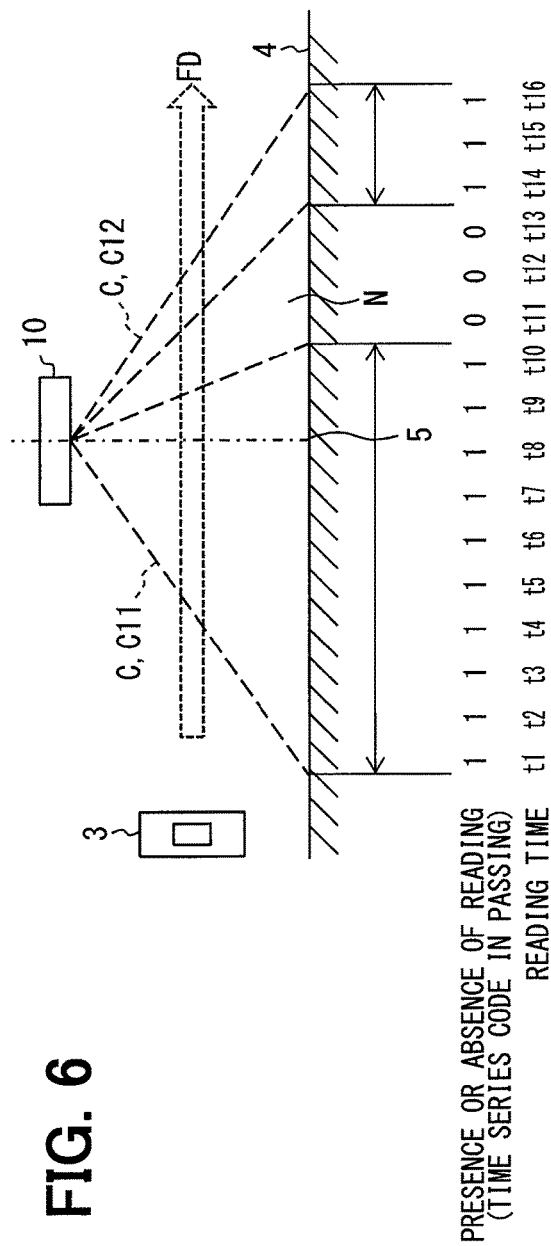
FIG. 6 is a diagram illustrating a communicable region according to at least one of embodiments.

FIG. 6 shows a communicable region C different from that in the first embodiment. Specifically, FIG. 6 shows two communicable regions C11, C12. The two communicable regions C1, C2 of the first embodiment shown in FIG. 3 are formed to be symmetrical with respect to the longitudinal direction of the passage 4 across the passing determination point 5.

On the other hand, the two communicable regions C11, C12 shown in FIG. 6 are formed to be asymmetrical with respect to the center of the passing determination point 5 in the longitudinal direction of the passage 4. More specifically, the communicable region C11 includes the passing determination point 5. The communicable region C12 is provided such that a length in the longitudinal direction is shorter than that of the communicable region C11. The communication disabled region N exists between the two communicable regions C11, C12.

In this way, in a case in which the two communicable regions C11, C12 are formed to be asymmetrical with respect to the center of the passing determination point 5 in the longitudinal direction of the passage 4, it can be also determined that the wireless tag 3 passes by the passing determination point 5 from which direction of the passage 4.

The reason of this is described with reference to FIG. 6, FIG. 7, and FIG. 8. In FIG. 6, a direction in which the wireless tag 3 is moved from a left side to a right side of the figures is defined as a forward direction FD, and a direction in which the wireless tag 3 is moved from the right side to the left side of the figures is defined as a backward direction BD. A result of the presence or absence of the reading shown in FIG. 6 is a time series code in passing when the wireless tag 3 is moved in the forward direction from a left end of the communicable region C11 to a right end of the communicable region C12. The time series code in passing shown in FIG. 6 is "1111111111000111".

Figure 7:
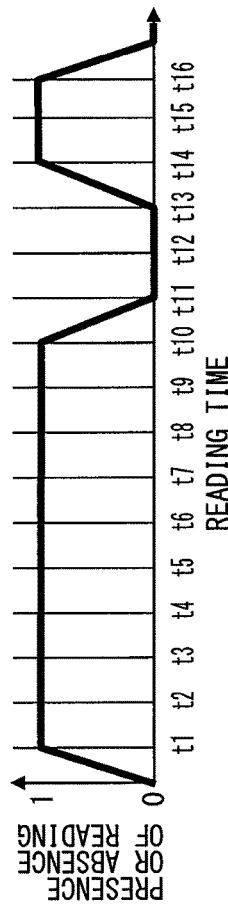
FIG. 7 is a diagram illustrating a line graph illustrating a relationship between a reading time and a time series code in passing shown in FIG. 6.

FIG. 7 is a line graph illustrating a relationship between the reading time and the time series code in passing shown in FIG. 6. On the other hand, FIG. 8 is a line graph illustrating a relationship between the reading time and the time series code in passing when the wireless tag 3 is moved in the backward direction from the right end of the communicable region C12 to the left end of the communicable region C11.

Figure 8:
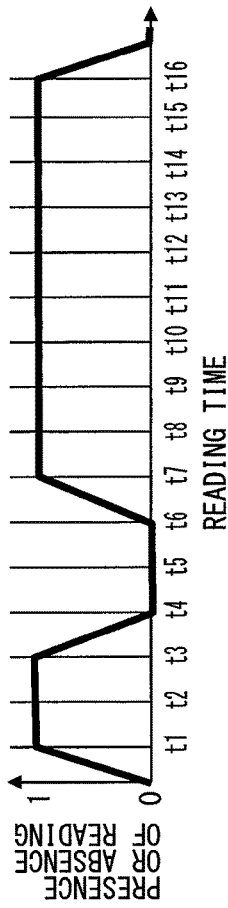
FIG. 8 is a diagram illustrating a line graph illustrating the relationship between the reading time and the time series code in passing when a wireless tag is moved in a backward direction.

The graph shown in FIG. 7 and the graph shown in FIG. 8 are different from each other. Thus, it is found that the time series code in passing in the forward direction and the time series code in passing in the backward direction are different from each other by arranging the communicable regions C aligned along the passage 4 asymmetrical with respect to the passing determination point 5. Since the time series codes in passing in the forward direction and in the backward direction are different from each other, it may be possible to determine that the wireless tag 3 passes by the passing determination point 5 from which direction of the passage 4 by comparing the time series code of the presence or absence of the reading with the two time series codes in passing.

Third Embodiment

The number of the communicable regions C is two in the first embodiment and the second embodiment. In a third embodiment, as shown in FIG. 9, four communicable regions C21, C22, C23, C24 are arranged, and the four communicable regions C are arranged to be asymmetrical with respect to the center of a passing determination point 5 in a longitudinal direction of a passage 4.

The four communicable regions C21, C22, C23, C24 are arranged in this order from an upstream side toward a downstream side in a forward direction. The forward direction is a direction in which a wireless tag 3 is moved from a left side toward a right side in the figure. Each region between the communicable regions C21, C22, C23, C24 formed as a communication disabled region N.

A length of the communicable region C21 in a passage direction is the same as a length of the communicable region C22 in the passage direction. A length of the communicable region C23 in the passage direction is four times as long as the length of the communicable region C21 in the passage direction. A length of the communicable region C24 in the passage direction is twice as long as the length of the communicable region C21 in the passage direction.

FIG. 9 shows each reading time when the wireless tag 3 is moved in the forward direction, each reading time when the wireless tag 3 is moved in the backward direction, and the presence or absence of the reading. Each of positions indicated by tn (n=any number from 1 to 24) and positions indicated by "1" or "0" showing the presence or absence of the reading corresponds to a position in the longitudinal direction of the passage 4. That is, a position of the wireless tag 3 in the longitudinal direction of the passage at each reading time when the wireless tag 3 is assumed to be moved in the forward direction is each of the positions indicated by tn, and a result of the presence or absence of the reading at each reading time is a numeral shown above tn.

The result of the presence or absence of the reading is the time series code in passing. The time series code in passing when the wireless tag 3 is moved in the forward direction is a numeric string in which the results of the presence and absence of the reading are aligned from the upstream side of the forward direction. The time series code in passing when the wireless tag 3 is moved in the backward direction is a numeric string in which the results of the presence and absence of the reading are aligned from the upstream side of the backward direction.

FIG. 10 shows a line graph of a relationship between the reading time and the time series code in passing when the wireless tag 3 is moved through the communicable regions C21, C22, C23, C24 shown in FIG. 9 in the forward direction. On the other hand, FIG. 11 shows a line graph of a relationship between the reading time and the time series code in passing when the wireless tag 3 is moved through the communicable regions C21, C22, C23, C24 shown in FIG. 9 in the backward direction.

Since the graph shown in FIG. 10 and the graph shown in FIG. 11 are different from each other, also in the third embodiment, it can be determined that the wireless tag 3 passes by the passing determination point 5 from which direction of the passage 4 in addition to whether the wireless tag 3 passes by the passing determination point 5.

Figure 12:
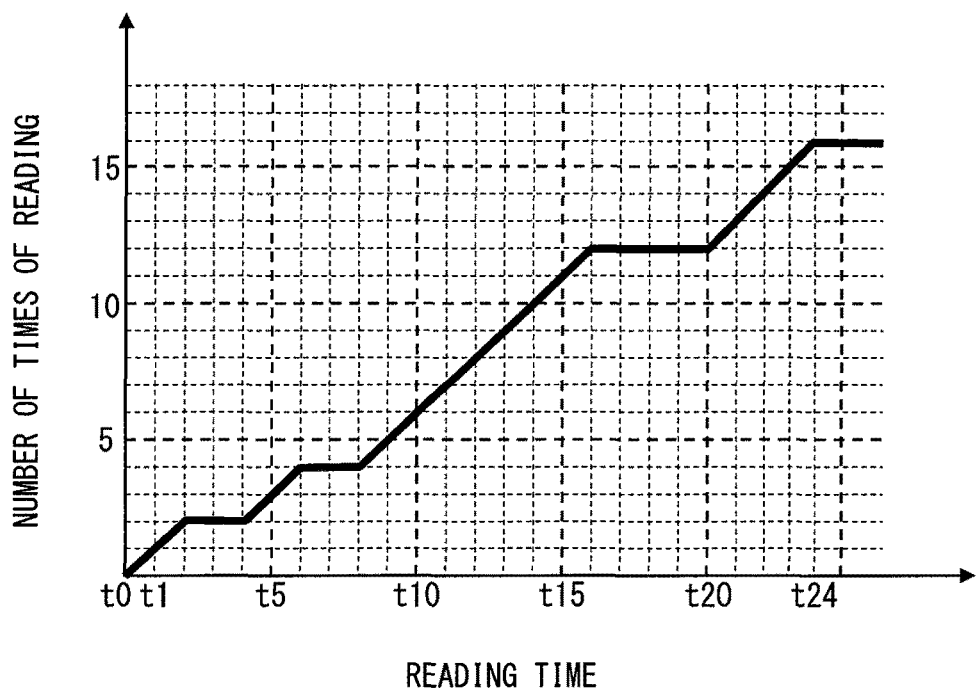
FIG. 12 is a diagram illustrating a graph in which a vertical axis represents the number of the readings in the graph shown in FIG. 10.
Figure 13:
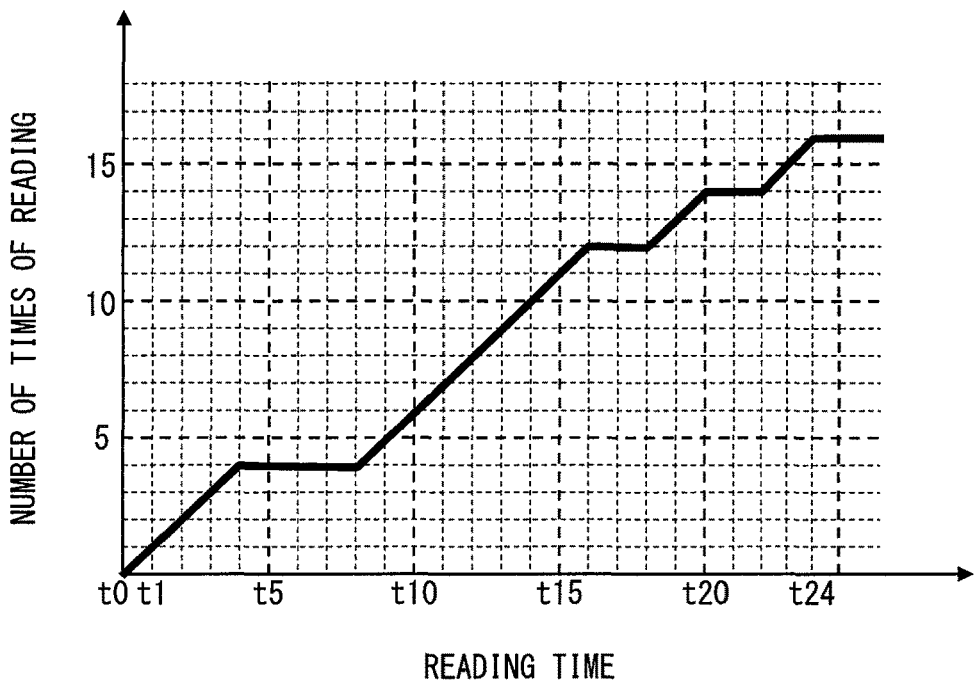
FIG. 13 is a diagram illustrating a graph in which a vertical axis represents the number of the readings in the graph shown in FIG. 11.

FIG. 12 shows a graph in which a vertical axis represents the number of the readings in the graph shown in FIG. 10. FIG. 13 shows a graph in which a vertical axis represents the number of the readings in the graph shown in FIG. 11. The graph shown in FIG. 12 and the graph shown in FIG. 13 are different from each other. It can be also determined whether the wireless tag 3 passes by the passing determination point 5 and that the wireless tag 3 passes by the passing determination point 5 in which direction of either of the forward direction or the backward direction by comparing a graph illustrating a change of the number of the readings against the reading time generated from the actual result of the presence or absence of the reading with the graphs illustrating the change of the number of the reading shown in FIG. 12 and FIG. 13.

In this case, the graph illustrating the change of the number of the readings against the reading time generated from the actual result of the presence or absence of the reading is a pattern of the presence or absence of the reading in association with a lapse of time, and each of the graphs shown in FIG. 12 and FIG. 13 is a pattern of the time series in passing to be compared with the pattern of the presence or absence of the reading in association with a lapse of time.

A line graph of the change of the presence or absence of the reading against the reading time may be generated from the actual result of the presence or absence of the reading and may be compared with the line graph shown in FIG. 10 or 11. In this case, the line graph generated from the actual result of the presence or absence of the reading is the pattern of the presence or absence of the reading in association with a lapse of time, and the line graph shown in FIG. 10 or 11 generated in advance is the pattern of the time series in passing to be compared with the pattern of the presence or absence of the reading in association with a lapse of time.

Figure 14:
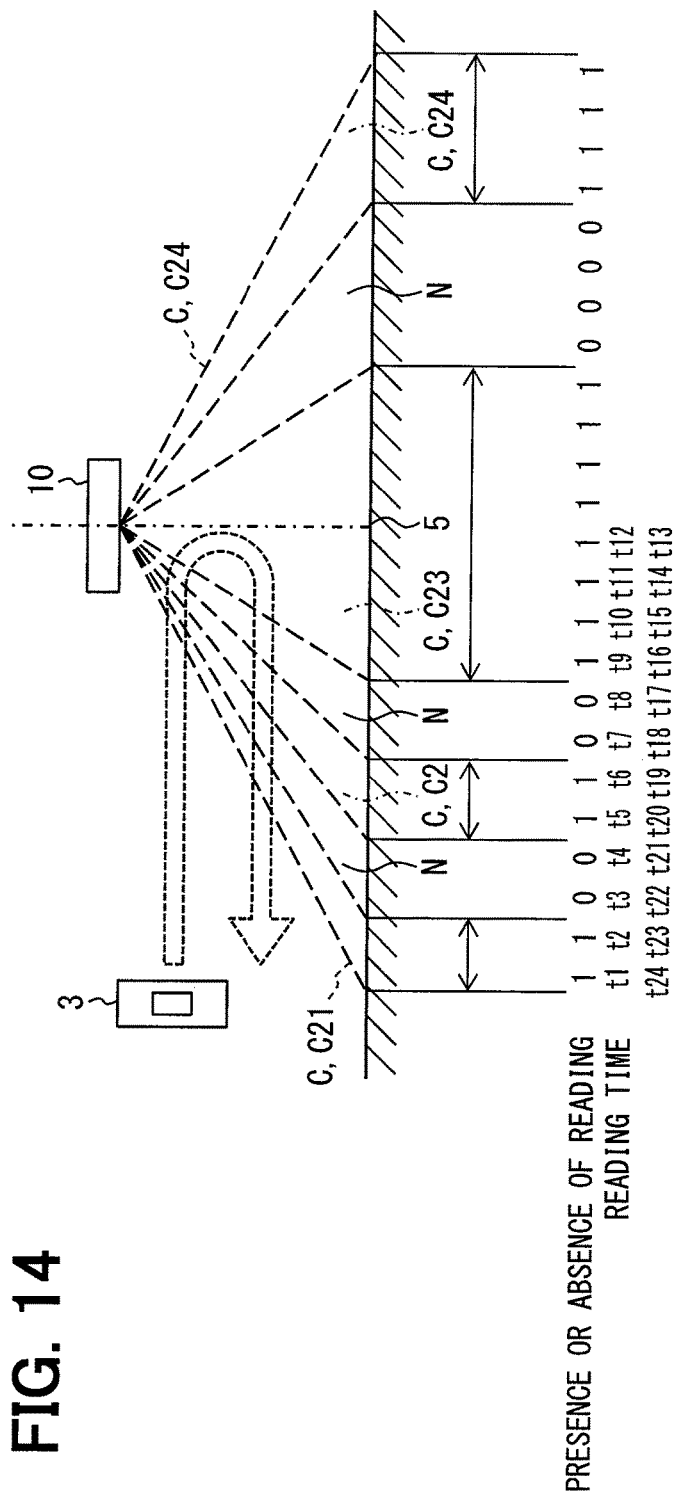
FIG. 14 is a diagram illustrating a relationship between the reading time and presence or absence of reading when the wireless tag is returned in a middle of a passage.
Figure 15:
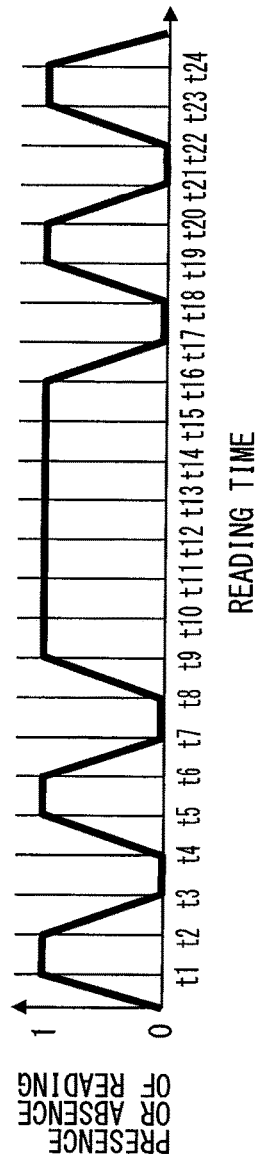
FIG. 15 is a diagram illustrating a line graph illustrating the relationship between the reading time and results of the presence or absence of the reading shown in FIG. 14.
Figure 16:
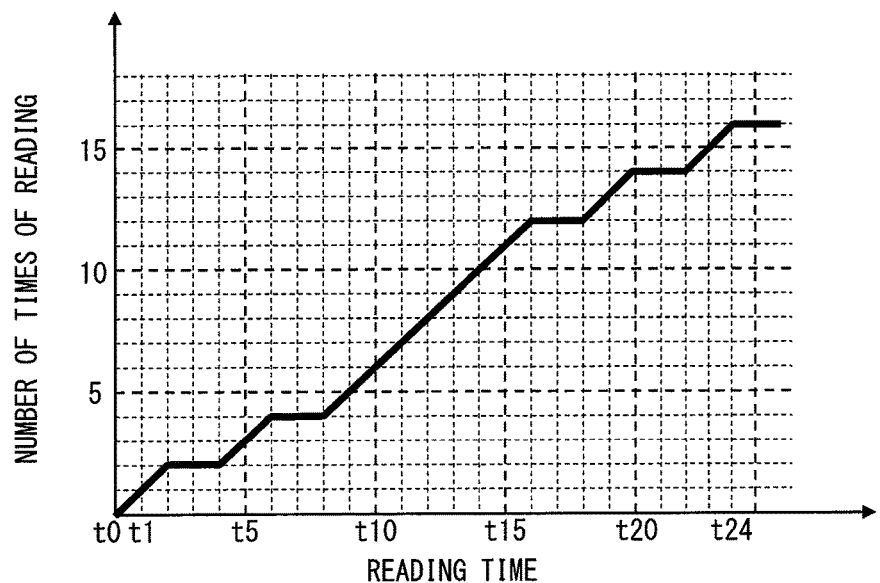
FIG. 16 is a diagram illustrating a graph in which a vertical axis represents the number of the readings in the graph shown in FIG. 15.

In a case in which the multiple communicable regions C are formed to be asymmetrical with respect to the center of the passing determination point 5 in the longitudinal direction of the passage 4, it may be possible to determine whether the wireless tag 3 is returned in a middle of the passage 4, FIG. 14 shows a relationship between the reading time and the presence or absence of the reading when the wireless tag 3 is moved to the passing determination point 5 in the forward direction and then is returned from the passing determination point 5. FIG. 15 shows a line graph illustrating the relationship between the reading time and the presence or absence of the reading shown in FIG. 14. FIG. 16 shows a graph in which a vertical axis represents the number of the readings in the graph shown in FIG. 15.

The graph shown in FIG. 15 is different from the graphs shown in FIG. 10 and FIG. 11. That is, in a case in which the wireless tag 3 is returned in a middle of the passage 4, the time series code of the presence or absence of the reading generated from the determination result of the presence or absence of the reading does not match with the time series code in passing. Thus, it is not erroneously determined that the wireless tag 3 passes by the passing determination point 5 and then moves along the passage 4 as it is, in a case in which the wireless tag 3 is returned in a middle of the passage 4.

In the present specification, in a case in which the wireless tag 3 is returned from a place near the passing determination point 5, even if the wireless tag 3 passes below the passing determination point 5, it is deemed that the wireless tag 3 does not pass by the passing determination point 5, even if the wireless tag 3 pass below the passing determination point 5. Specifically, a place near the passing determination point 5 is a region in which the communicable region C exists.

In FIG. 14, the two reading times are allotted for one determination result of the presence or absence of the reading. In a case in which the wireless tag 3 is returned in a middle of the passage 4, it is assumed that, in the time series code of the presence or absence of the reading, the code before the return time and the code after the return time are the same to each other.

In the graph shown in FIG. 15, a shape of the graph of and before time t12 and a shape of the graph of and after time t13 are in line symmetrical to each other. In the graph shown in FIG. 16, a shape of the graph of and before time t12 and a shape of the graph of and after time t13 are in point symmetrical to each other.

Thus, when a whole of the time series code of the presence or absence of the reading is divided into two halves, and a former half and a latter half form a symmetrical code to each other, it can be determined that the wireless tag 3 is returned in a middle of the passage 4. The symmetrical code is a code in which an original aligning order of the code is the same as an aligning order reversed from the original aligning order.

Figure 17:
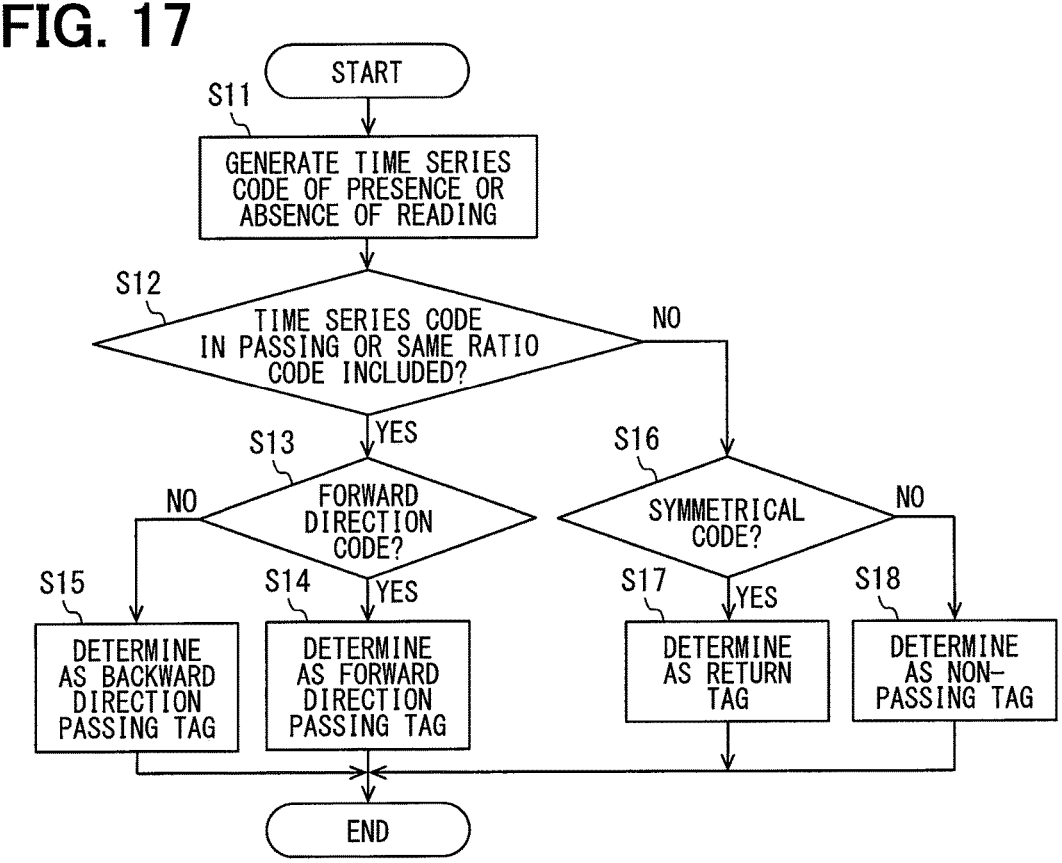
FIG. 17 is a flowchart illustrating processing executed by a passing determination section according to at least one of embodiments.

FIG. 17 is a flowchart illustrating processing executed by the passing determination section 22 in the third embodiment. S11 is the same processing as S1 shown in FIG. 5, and the time series code of the presence or absence of the reading is generated for each wireless tag.

S12 is the same processing as S2 shown in FIG. 5, and it is determined whether the time series code in passing or the code having the same ratio of the presence or absence of the reading as that in the time series code in passing is included in the time series code of the presence or absence of the reading generated in S11. In a case of YES in this determination, the procedure proceeds to S13.

In S13, it is determined whether the code that is determined to be included in the time series code in passing in S12 is the time series code in passing in the forward direction. In a case of YES in the determination, the procedure proceeds to S14, and it is determined that the wireless tag 3 is a forward direction passing Lag that passes by the passing determination point 5 in the forward direction. In a case of NO in the determination of S13, the procedure proceeds to S15, and it is determined that the wireless tag 3 is a backward direction passing tag that passes by the passing determination point 5 in the backward direction.

In a case of NO in the determination of S12, the procedure proceeds to S16. In S16, it is determined whether the time series code of the presence or absence of the reading generated in S11 is the symmetrical code. In a case of YES in the determination of S16, the procedure proceeds to S17. In S17, it is determined that the wireless tag 3 is a return tag that is returned in a middle of the passage 4.

Figures 18A, 18B, 18C:
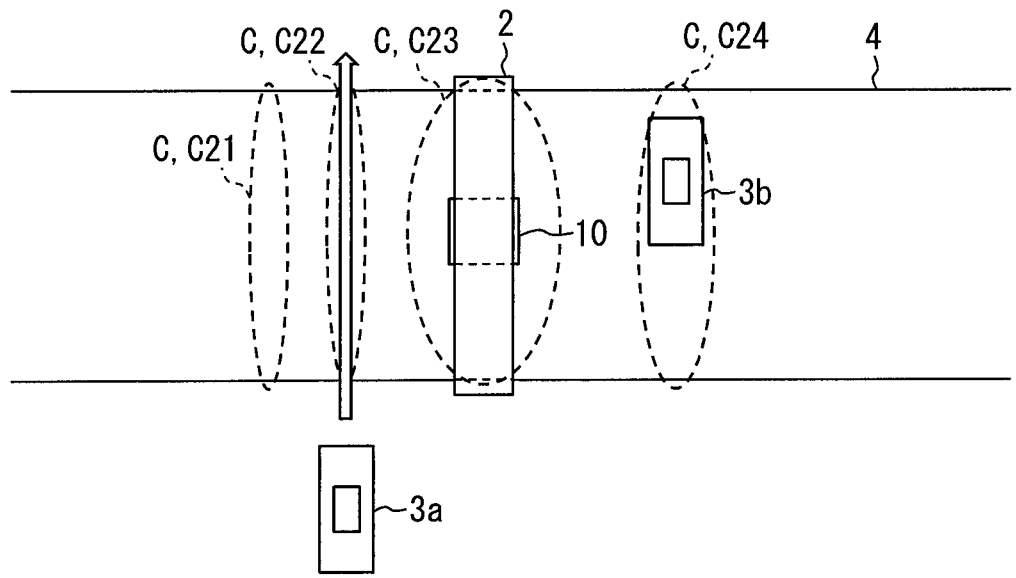
FIG. 18A is a diagram illustrating a case of determining a wireless tag as a non-passing tag.
FIG. 18B is a diagram illustrating a case of determining a wireless tag as a non-passing tag.
FIG. 18C is a diagram illustrating a case of determining a wireless tag as a non-passing tag.

In a case of NO in the determination of S16, the procedure proceeds to S18. In S18, it is determined that the wireless tag 3 is a non-passing tag that does not pass by the passing determination point 5. FIG. 18A to FIG. 18C show an example in which the wireless tag 3 is determined as the non-passing tag. FIG. 18A is a bird's-eye view of the passage 4 around the tag reader 10.

A wireless tag 3a shown in FIG. 18A is moved along a longitudinal direction shown by an arrow of the communicable region C22 formed to be oval. In this case, the wireless tag 3a passes through the communicable region C22. The wireless tag 3a does not pass through the communicable regions C21, C23, C24.

Thus, the time series code of the presence or absence of the reading with respect to the wireless tag 3a generated by the tag reader 10 in S11 shown in FIG. 17 is a code in which the numerals of "1" are continuously arranged and the numeral of "0" is not arranged between the numerals of "1" as shown in FIG. 18B. Accordingly, it is prevented from erroneously determining that the wireless tag 3a that is moving near the passing determination point 5 but does not pass by the passing determination point 5 is the passing tag.

A wireless tag 3b shown in FIG. 18A is stopped in the communicable region C24. Thus, the time series code of the presence or absence of the reading with respect to the wireless tag 3b generated by the tag reader 10 in S11 shown in FIG. 17 is also a code in which the numerals of "1" are continuously arranged and the numeral of "0" is not arranged between the numerals of "1" as shown in FIG. 18C. Accordingly, it is prevented from erroneously determining that the wireless tag 3b that is stopped near the passing determination point 5 is the passing tag.

Fourth Embodiment

Figure 19:
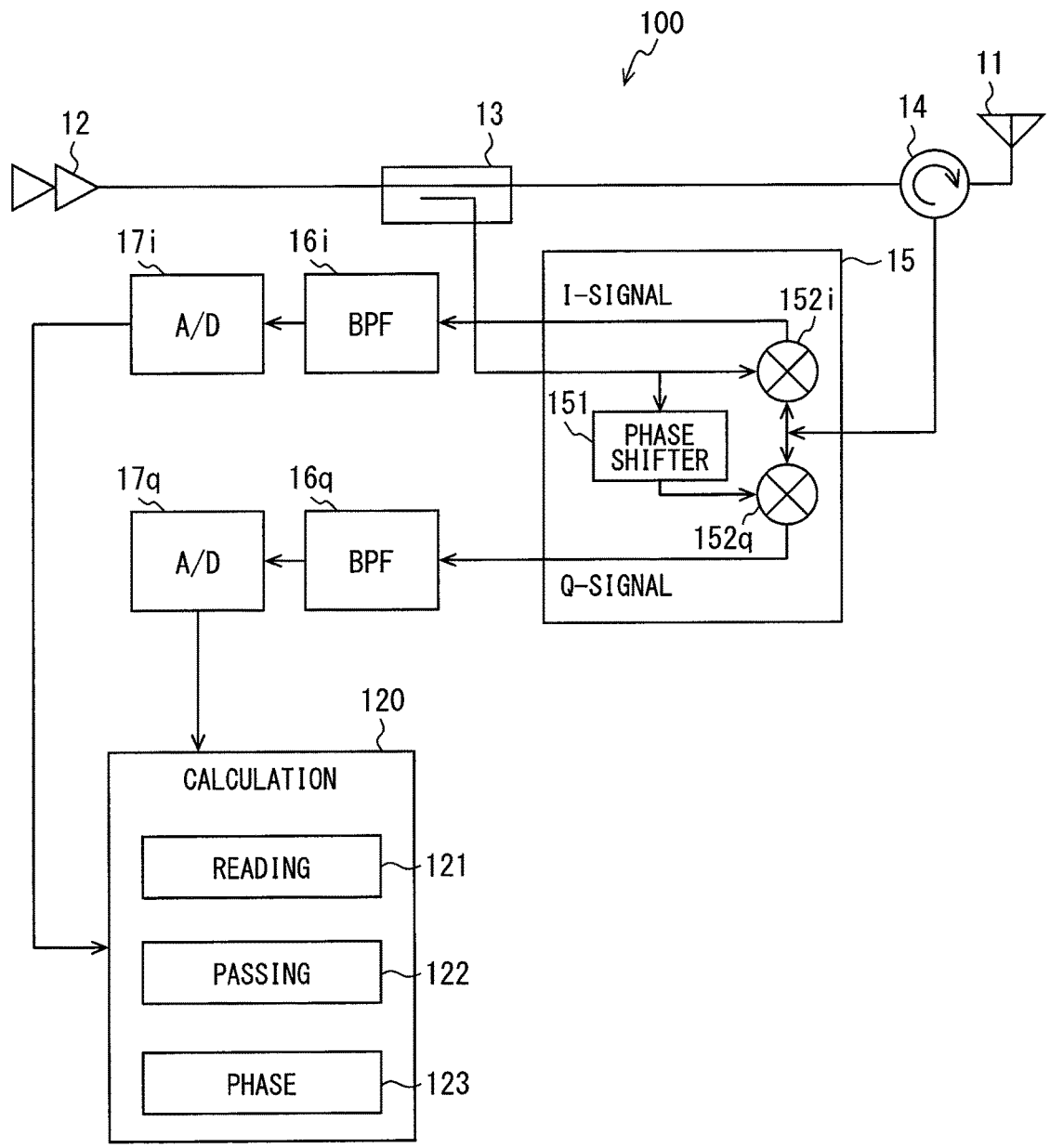
FIG. 19 is a block diagram illustrating a configuration of a tag reader according to at least one of embodiments.

A tag reader 100 according to a fourth embodiment includes a configuration shown in FIG. 19. In the tag reader 100, a function executed by a calculation portion 120 is different from that in the former embodiments. As shown in FIG. 19, the calculation portion 120 includes a reading determination section 121, a passing determination section 122, and a phase calculation section 123.

The reading determination section 121 is the same as the reading determination section 21 in the former embodiments. The passing determination section 122 will be described below with reference to FIG. 20.

The phase calculation section 123 acquires a signal representing a reception wave and successively calculates a phase $\Phi_r$ of the reception wave. The phase $\Phi_r$ of the reception wave is calculated from an expression 1. In the expression 1, $A_Q$ is amplitude of Q-signal, and $A_I$ is amplitude of I-signal. The expression 1 can be calculated from a wave function of the reception wave.

$$\phi_r = \tan^{-1}\left(\frac{A_Q}{A_I}\right) \qquad \text{Expression 1}$$

The phase $\Phi_r$ of the reception wave is determined by a propagation distance L and does not depend on a time. The reason will be described below. A wave function of an electromagnetic wave is represented by an expression 2.

$$\psi = A e^{j(\omega t - \beta L)} \qquad \text{Expression 2}$$
$$\beta = \frac{2\pi}{\lambda}$$
$$\omega = 2\pi f$$
$$\lambda = c/f$$

In the expression 2, the symbol A represents amplitude (W), the symbol $\lambda$ represents wavelength (m), and the symbol L represents a propagation distance (m).

A phase $\Phi$ of the electromagnetic wave is represented by an expression 3 based on the expression 2. Among phases in the expression 3, $\omega t$ is a time phase and $\beta L$ is a space phase.

$$\phi:[\text{rad}] = \omega t - \beta L \qquad \text{Expression 3}$$

In the expression 3, the symbol $\beta$ represents a phase constant (rad/m), and the symbol $\omega$ represents angular frequency (rad/s).

As shown in an expression 4, it is found that the phase $\Phi_r$ of the reception wave is represented only by the space phase $\beta L$ and the time phase $\omega t$ is deleted. This is because a reception time $t_r$ and a transmission time $t_t$ are substantially equal to each other.

$$\phi_r - \phi_t = \omega(t_r - t_t) - \beta L \qquad \text{Expression 4}$$
$$\approx -\beta L$$

In the expression 4, the symbol $\phi_r$ represents a phase of a reception wave (rad), the symbol $\phi_t$ represents a phase of a transmission wave (rad), the symbol $t_r$ represents a reception time (s), and the symbol $t_t$ represents a transmission time (s).

Since the phase $\Phi_r$ of the reception wave is determined by the propagation distance L and does not depend on a time, in a case in which the phase $\Phi_r$ of the reception wave is not changed, it can be assumed that the wireless tag 3 is not moved. The passing determination section 122 uses this to determine whether the wireless tag 3 is moved, and generates the time series code of the presence or absence of the reading while excluding the determination result of the presence or absence of the reading determined in a state in which it is assumed that the wireless tag 3 is not moved.

Figure 20:
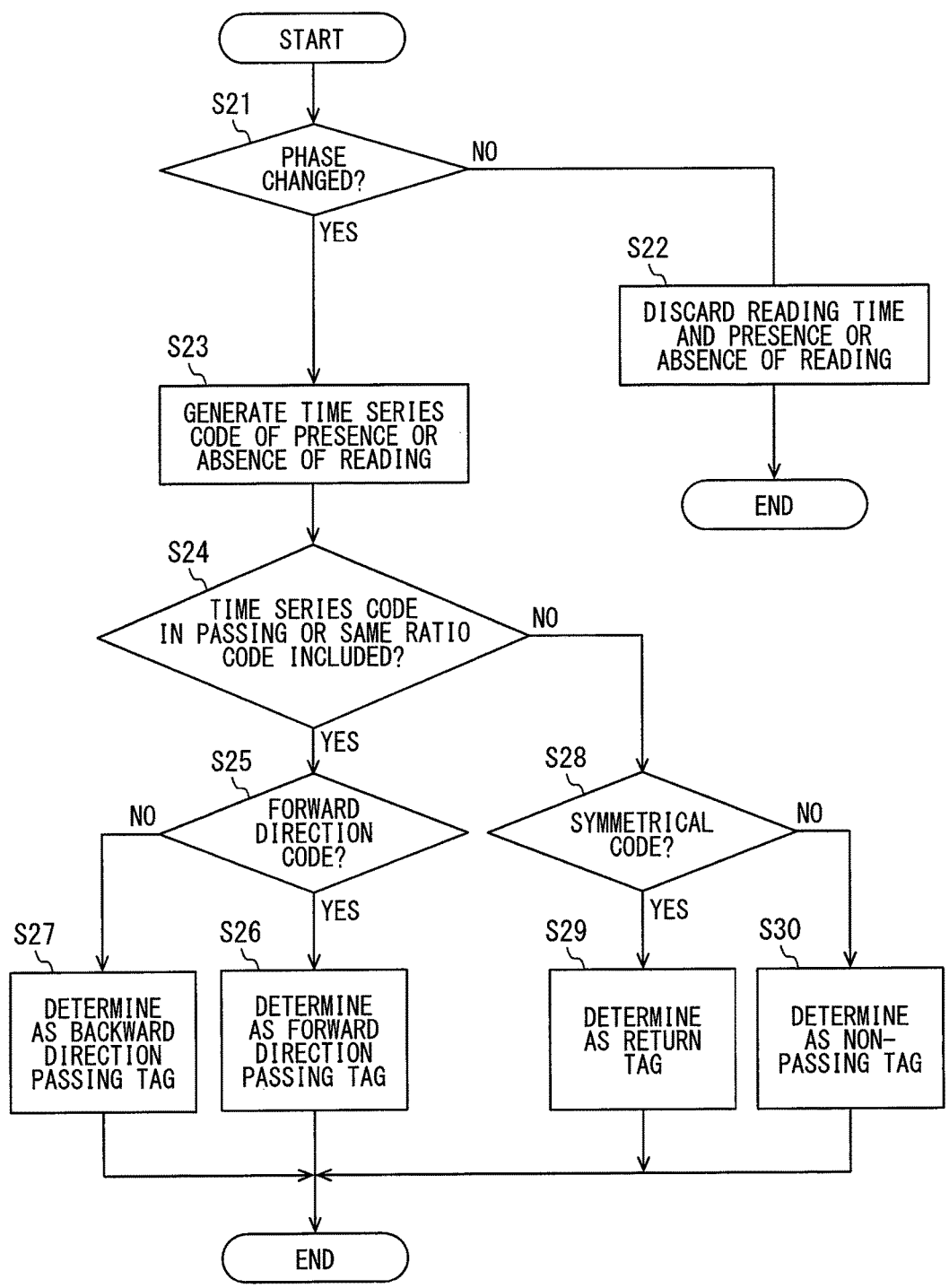
FIG. 20 is a flowchart illustrating processing executed by a passing determination section shown in FIG. 19.

FIG. 20 shows processing executed by the passing determination section 122. The passing determination section 122 executes the processing shown in FIG. 20 every time when the transmission wave is transmitted. In S21, it is determined whether a phase $\Phi_r$ of the reception wave calculated by the phase calculation section 123 is changed from a phase $\Phi_r$ of the reception wave calculated by the phase calculation section 123 at a previous time. It is deemed that the determination of S21 is to determine whether the wireless tag 3 is stopped or moved.

In a case of NO in the determination of S21, the procedure proceeds to S22. In S22, the determination result of the presence or absence of the reading determined by the reading determination section 121 at this time, and the reading time thereof are discarded. With this processing in S22, it is deemed that the reading time is not elapsed from the reading time at the previous time. After S22 is executed, the processing shown in FIG. 20 is ended. In this case, when the transmission data is transmitted at a next time, the processing shown in FIG. 20 is executed from the beginning. In a case of YES in the determination of S21, the procedure proceeds to S23.

In S23, the time series code of the presence or absence of the reading is generated for each wireless tag. The processing of S23 is substantially the same as that of S1 shown in FIG. 5 and S11 shown in FIG. 17. However, since the processing of S21 and S22 are executed before the processing of S23, in the S23, the time series of the presence or absence of the reading is generated while excluding the determination result of the presence or absence of the reading read from the wireless tag 3 being stopped. The processing of and after S24 are the same as that of and after S12 shown in FIG. 17.

In the fourth embodiment, the tag reader 100 includes the phase calculation section 123, and it is determined whether the wireless tag 3 is moved from the change of the phase $\Phi_r$ of the reception wave. Further, the time series code of the presence or absence of the reading is generated while excluding the determination result of the presence or absence of the reading determined in a state in which the wireless tag 3 is not moved. This configuration decreases the case where the time series code in passing or the code having the same ratio of the presence and absence of the reading as that in the time series code in passing is not included in the time series code of the presence or absence of the reading when the wireless tag 3 passes by the passing determination point 5. Thus, it can be prevented from determining that the wireless tag 3 does not pass by the passing determination point 5 although the wireless tag 3 actually passes by the passing determination point 5.

As above, the embodiments of the present disclosure are described. The present disclosure is not limited to the embodiments described above. The following modifications are encompassed in the scope of the present disclosure. In addition to the modifications, the present disclosure can be carried out by changing the configuration of the embodiments and modifications within the subject matter of the present disclosure.

(First Modification)

In the embodiments described above, the antenna 11 is one array antenna. Multiple antennas may be provided and form multiple communicable regions C.

(Second Modification)

In the embodiments described above, the tag reader 10, 100 includes the passing determination section 22, 122. However, a device other than the tag reader 10, 100, for example a controller that controls the tag reader 10, 100, may include the passing determination section 22, 122. Furthermore, a device other than the tag reader 100 may also include the phase calculation section 123.

Further, the antenna may provide the multiple communicable regions asymmetrical with respect to a center of the passing determination point in the longitudinal direction of the passage.

According to this configuration, the patterns of the presence and absence of the reading in association with a lapse of time are different from each other between in a case in which the wireless tag passes by the passing determination point in the forward direction from one side to the other side of the passage and in a case in which the wireless tag passes by the passing determination point in the backward direction. Accordingly, in addition to determining whether the wireless tag passes by the passing determination point, it may be possible to determine whether the wireless tag is moved in the forward direction or in the backward direction.

In a case in which the wireless tag is returned in a middle of the passage, when a whole of the pattern of the presence or absence of the reading is divided into the former half and the latter half, there is a possibility that the former half pattern and the latter half pattern form a symmetrical pattern. In contrast to this, in a case in which the wireless tag passes through all of the communicable regions, a possibility of that the former half and the latter half of the pattern of the presence or absence of the reading in association with a lapse of time form a symmetrical pattern is low. Accordingly, it may be possible to distinguish whether the wireless tag passes through all of the communicable regions or the wireless tag is returned in a middle of the passage.

Further, the tag reader transmits a transmission wave to the multiple communicable regions, and in a case in which the wireless tag exists in the multiple communicable regions, the tag reader may acquire a signal representing a reception wave that is electric wave transmitted by the wireless tag in response to the transmission wave and received by the antenna, and may determine whether the signal transmitted by the wireless tag is read. The wireless tag passing determination apparatus may further include a phase calculation section that acquires the signal representing the reception wave and successively calculates a phase of the reception wave. The passing determination section may generate the pattern of the presence or absence of the reading without using a determination result as to whether the signal transmitted by the wireless tag is read when the phase calculated by the phase calculation section is not changed from the phase calculated at a previous time.

In a case in which the result of the presence or absence of the reading when the wireless tag is not moved is included in the pattern of the presence or absence of the reading, even if the wireless tag passes by the passing determination point, changes in the time/period in which the wireless tag is not moved may lead to changes in the pattern of the presence or absence of the reading. As a result, accuracy of the determination as to whether the wireless tag passes by the passing determination point may be deteriorated.

According to this configuration, it is reduced the case that the result of the presence or absence of the reading when the wireless tag is not moved is included in the pattern of the presence or absence of the reading when the wireless tag passes by the passing determination point. Thus, it may be possible to prevent an erroneous determination that the wireless tag does not pass by the passing determination point although the wireless tag actually passes by the passing determination point.

The flowcharts included or the processing in the flowcharts in the present application includes multiple steps (or referred to as sections) each referred to as S1 or the like. Each of the steps can be divided into multiple substeps, whereas multiple steps can be combined to a single step.

While the embodiments, the configurations, the aspects of a wireless tag passing determination apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A wireless tag passing determination apparatus comprising:
    an antenna that provides a plurality of communicable regions and a communication disabled region, the communicable regions being arranged alternately with the communication disabled region, such that the plurality of communicable regions includes both sides of a passing determination point in a longitudinal direction of a passage in which passing of a wireless tag is determined;
    a tag reader that determines whether to read a signal transmitted by the wireless tag, based on a signal representing electric wave transmitted by the wireless tag existing in the plurality of communicable regions and received by the antenna; and
    a passing determination section that determines whether the wireless tag passes by the passing determination point on the passage, based on a pattern of presence or absence of reading in association with a lapse of time, the pattern of the presence or the absence of the reading being a pattern generated when the tag reader reads the signal transmitted by the wireless tag, the pattern of the presence or the absence of the reading including at least one result by the tag reader indicative of the absence of the reading and at least two results by the tag reader indicative of the presence of the reading,
    wherein:
    the communication disabled region is positioned between two of the communicable regions; and
    the passing determination point is positioned between the two of the communicable regions on the passage.

2. The wireless tag passing determination apparatus according to claim 1, wherein:
    the antenna provides the plurality of communicable regions that is asymmetrical with respect to a center of the passing determination point in the longitudinal direction of the passage.

3. The wireless tag passing determination apparatus according to claim 1, wherein:
    the tag reader transmits a transmission wave to the plurality of communicable regions;
    the tag reader acquires a signal representing a reception wave that is electric wave transmitted by the wireless tag in response to the transmission wave and received by the antenna in a case in which the wireless tag exists in the plurality of communicable regions, and determines whether to read the signal transmitted by the wireless tag;
    the wireless tag passing determination apparatus further comprises
    a phase calculation section that acquires the signal representing the reception wave and successively calculates a phase of the reception wave; and
    the passing determination section generates the pattern of the presence or the absence of the reading without using a determination result as to whether the signal transmitted by the wireless tag is read, the determination result being obtained at a time the phase calculated by the phase calculation section is not changed from the phase calculated at a previous time.

4. The wireless tag passing determination apparatus according to claim 1, wherein:
    the passing determination section generates the pattern of presence or the absence of the reading in association with the lapse of time.

5. The wireless tag passing determination apparatus according to claim 4, wherein:
    the passing determination section stores a reference pattern showing results of the presence or the absence of the reading with the lapse of time when the wireless tag moves from end to end of the communicable regions; and
    the passing determination section compares the pattern of presence or the absence of reading with the reference pattern so as to determine whether the wireless tag passes by the passing determination point.

6. The wireless tag passing determination apparatus according to claim 1, wherein:
    the pattern of the presence or absence of the reading includes only two symbols including
        a first symbol indicative of a case where the reading has been performed, and
        a second symbol indicative of a case where the reading has not been performed.

7. A wireless tag passing determination system comprising:
    a passage where it is determined whether a wireless tag passes on; and
    a wireless tag passing determination apparatus including
    an antenna that provides a plurality of communicable regions and a communication disabled region, the communicable regions being arranged alternately with the communication disabled region, such that the plurality of communicable regions includes both sides of a passing determination point in a longitudinal direction of the passage,
    a tag reader that determines whether to read a signal transmitted by the wireless tag, based on a signal representing electric wave transmitted by the wireless tag existing in the plurality of communicable regions and received by the antenna, and
    a passing determination section that determines whether the wireless tag passes by the passing determination point on the passage, based on a pattern of presence or absence of reading in association with a lapse of time, the pattern of the presence or the absence of the reading being a pattern generated when the tag reader reads the signal transmitted by the wireless tag, the pattern of the presence or absence of the reading including at least one result by the tag reader indicative of the absence of the reading and at least two results by the tag reader indicative of the presence of the reading,
    wherein:
    the communication disabled region is positioned between two of the communicable regions; and
    the passing determination point is positioned between the two of the communicable regions on the passage.

8. The wireless tag passing determination apparatus according to claim 7, further comprising:
a reading determination section that generates and stores the pattern of the presence or the absence of the reading based on a determination result of the tag reader.

9. The wireless tag passing determination apparatus according to claim 8, wherein:
the pattern includes two parts of the presence of the reading and one part of the absence of the reading; and
the one part of the absence of the reading is arranged between the two parts of the presence of the reading.

10. The wireless tag passing determination apparatus according to claim 6, wherein the first symbol is a "1" and the second symbol is a "0."

\* \* \* \* \*